(12) United States Patent
Li et al.

(10) Patent No.: US 9,775,018 B2
(45) Date of Patent: Sep. 26, 2017

(54) OFFLINE CHARGING FOR PROXIMITY SERVICES

(71) Applicant: Alcatel-Lucent USA Inc., Murray Hill, NJ (US)

(72) Inventors: Xiang Yang Li, Beijing (CN); Yigang Cai, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 192 days.

(21) Appl. No.: 14/586,334

(22) Filed: Dec. 30, 2014

(65) Prior Publication Data
US 2015/0326737 A1    Nov. 12, 2015

Related U.S. Application Data

(60) Provisional application No. 61/991,272, filed on May 9, 2014.

(51) Int. Cl.
*H04W 4/24* (2009.01)
*H04M 15/00* (2006.01)
*H04W 4/00* (2009.01)
*H04W 8/00* (2009.01)

(52) U.S. Cl.
CPC .............. *H04W 4/24* (2013.01); *H04M 15/65* (2013.01); *H04M 15/93* (2013.01); *H04W 4/008* (2013.01); *H04W 8/005* (2013.01)

(58) Field of Classification Search
CPC ....... H04W 4/24; H04W 4/008; H04W 8/005; H04M 15/65; H04M 15/93
See application file for complete search history.

(56) References Cited

U.S. PATENT DOCUMENTS

2008/0147524 A1*  6/2008  Connelly .............. G06Q 30/04
                                                    705/30

OTHER PUBLICATIONS

3GPP TS 32.240 V8.6.0 (Jun. 2010) 3rd Generation Partnership Project; Technical Specification Group Services and System Aspects; Telecommunication management; Charging management; Charging architecture and principles (Release 8).*
3rd Generation Partnership Project, Feasibility Study for Proximity Services (ProSe), 3GPP TR 22.803, Version 12.2.0 (Jun. 2013).
3rd Generation Partnership Project, Proximity-based Services, 3GPP TS 23.303, Version 12.0.0 (Feb. 2014).
3rd Generation Partnership Project, Study on LTE Device to Device Proximity Services, 3GPP TR 36.843, Version 12.0.1 (Mar. 2014).

* cited by examiner

*Primary Examiner* — Marcos Torres
(74) *Attorney, Agent, or Firm* — Duft Bornsen & Fettig, LLP (57) ABSTRACT

Systems and methods for performing offline charging for proximity services. One embodiment is a proximity service element that controls proximity services for a mobile network. The proximity service element receives a request from User Equipment (UE) for a proximity service, and collects offline charging information related to the proximity service. The proximity service element formats the offline charging information into an offline charging communication, and transmits the offline charging communication to an offline charging system.

20 Claims, 4 Drawing Sheets

OFFLINE CHARGING FOR PROXIMITY SERVICES

RELATED APPLICATIONS

This non-provisional patent application claims priority to U.S. Provisional Patent Application No. 61/991,272 filed on May 9, 2014, which is incorporated by reference as if fully provided herein.

FIELD OF THE INVENTION

The invention is related to the field of communication systems and, in particular, to charging for proximity services.

BACKGROUND

Proximity services or proximity-based services refer to services provided between devices (i.e., User Equipment (UE)) being in proximity to each other. Proximity services utilize the radio technologies of the UEs so that the UEs in close proximity can exchange communications directly with one another without going through the core network, which is also referred to as device-to-device (D2D) communications. A UE is considered in "proximity" of another UE if they are able to establish direct communications.

The Third Generation Partnership Program (3GPP) has defined Proximity Services (ProSe) for a Long Term Evolution (LTE) network. ProSe allows for D2D communications as an underlay to the cellular network. In D2D communications, UEs transmit data signals to each other over a direct link using the cellular resources instead of routing the data signals through the core network. Therefore, D2D communications involve directly transmitting traffic between UEs that are in the vicinity of one another instead of routing the traffic over a core network, such as the Evolved Packet Core (EPC). Because there is direct communication between UEs that are in close proximity, D2D communications offload traffic from the EPC network without additional infrastructure. D2D communications may also offer higher data rates, lower transfer delays, and better power efficiency within a UE.

Proximity services generally include direct discovery, direct communication, and UE-to-network relay. Direct discovery is a function where a UE identifies other UEs that are in proximity Direct communication is a function where UEs in proximity are able to communicate using local radio resources. UE-to-network relay is a function where a UE can relay traffic from a remote UE to the network, or from the network to the remote UE. For example, if a UE (referred to as a remote UE) is outside of the coverage area of the base stations for a network, then the UE-to-network relay function allows the remote UE to transmit traffic to a relay UE that is in the coverage area of a base station through a direct communication with the relay UE. The relay UE in turn forwards the traffic from the remote UE to the network by communicating with a base station of the network.

Although the 3GPP has defined proximity services and related architectures, the 3GPP has failed to define how to charge for proximity services.

SUMMARY

Embodiments described herein provide an offline charging mechanism for proximity services. A proximity service element of a mobile network interacts with a UE that is enabled for a proximity service. For example, the UE may contact the proximity service element to request authorization for the proximity service, to request permission to initiate discovery of other UEs that are proximate, to request permission to initiate a direct communication with other UEs that are discovered as proximate, etc. The proximity service element includes a Charging Trigger Function (CTF) that is configured to trigger a charging event in response to one or more of these interactions with the UE involving the proximity service, and collects charging information that pertains to the proximity service. The proximity service element then provides the charging information to an offline charging system so that a network operator may charge for the proximity service.

One embodiment comprises a proximity service element configured to control proximity services for a mobile network. The proximity service element includes a controller configured to receive a request from a UE for a proximity service, to collect offline charging information related to the proximity service, to format the offline charging information into an offline charging communication, and to transmit the offline charging communication to an offline charging system.

In another embodiment, the controller is configured to communicate with the offline charging system over a Diameter Rf interface, and at least one Attribute Value Pair (AVP) is defined in the Diameter Rf interface for the offline charging information related to the proximity service.

In another embodiment, an AVP may be defined for an application identifier for an application on the UE that is designed to perform functions of the proximity service, and an AVP may be defined for an application code used by the UE in a discovery procedure.

In another embodiment, an AVP may be defined for a charging identifier, wherein the charging identifier is a unique identifier assigned to the proximity service by the proximity service element.

In another embodiment, an AVP may be defined for a discovery model used by the UE in a discovery procedure, wherein the discovery model is selected between Model A and Model B as defined by the Third Generation Partnership Project (3GPP). An AVP may be defined for a discovery role type used by a UE during the discovery procedure according to the discovery model, wherein the discovery role type is selected between announcing, monitoring, and match report under Model A, or between discoverer and discoveree under Model B.

In another embodiment, an AVP may be defined for a direct communication type requested by the UE for a direct communication, wherein the direct communication type is selected between One-to-One, One-to-Many (or One-to-Group), and One-to-All.

In another embodiment, an AVP may be defined for a direct communication mode indicating whether the UE acts as a transmitter or receiver for a One-to-Many or One-to-All communication type.

In another embodiment, the controller is configured to communicate with the offline charging system over a Ga interface by sending a Charging Data Record (CDR), and at least one field of the CDR is defined for the offline charging information related to the proximity service.

In another embodiment, the controller implements a Charging Data Function (CDF) for offline charging.

Another embodiment comprises a method for implementing offline charging in a proximity service element of a mobile network that is configured to control proximity services for the mobile network. The method includes receiving a request from UE for a proximity service, collecting offline charging information related to the proximity service, formatting the offline charging information into an offline charging communication, and transmitting the offline charging communication from the proximity service element to an offline charging system.

Another embodiment comprises an Offline Charging System (OFCS) configured to communicate with a proximity service element that controls proximity services for a mobile network. The OFCS includes a controller configured to receive an offline charging communication from the proximity service element that includes offline charging information for a proximity service involving a UE, and to parse the offline charging communication to identify a charging identifier assigned to the proximity service by the proximity service element. The controller is configured to identify Charging Data Records (CDRs) generated for the proximity service that include the charging identifier, and to correlate the CDRs identified for the proximity service to generate a correlated CDR.

In another embodiment, the controller in the OFCS is configured to receive the offline charging information from the proximity service element in a Diameter Rf Accounting Request (ACR), and an Attribute Value Pair (AVP) is defined in the Diameter Rf ACR for the charging identifier.

In another embodiment, the controller in the OFCS is configured to receive the offline charging information from the proximity service element in a CDR generated by the proximity service element, and a new field is defined in the CDR for the charging identifier.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
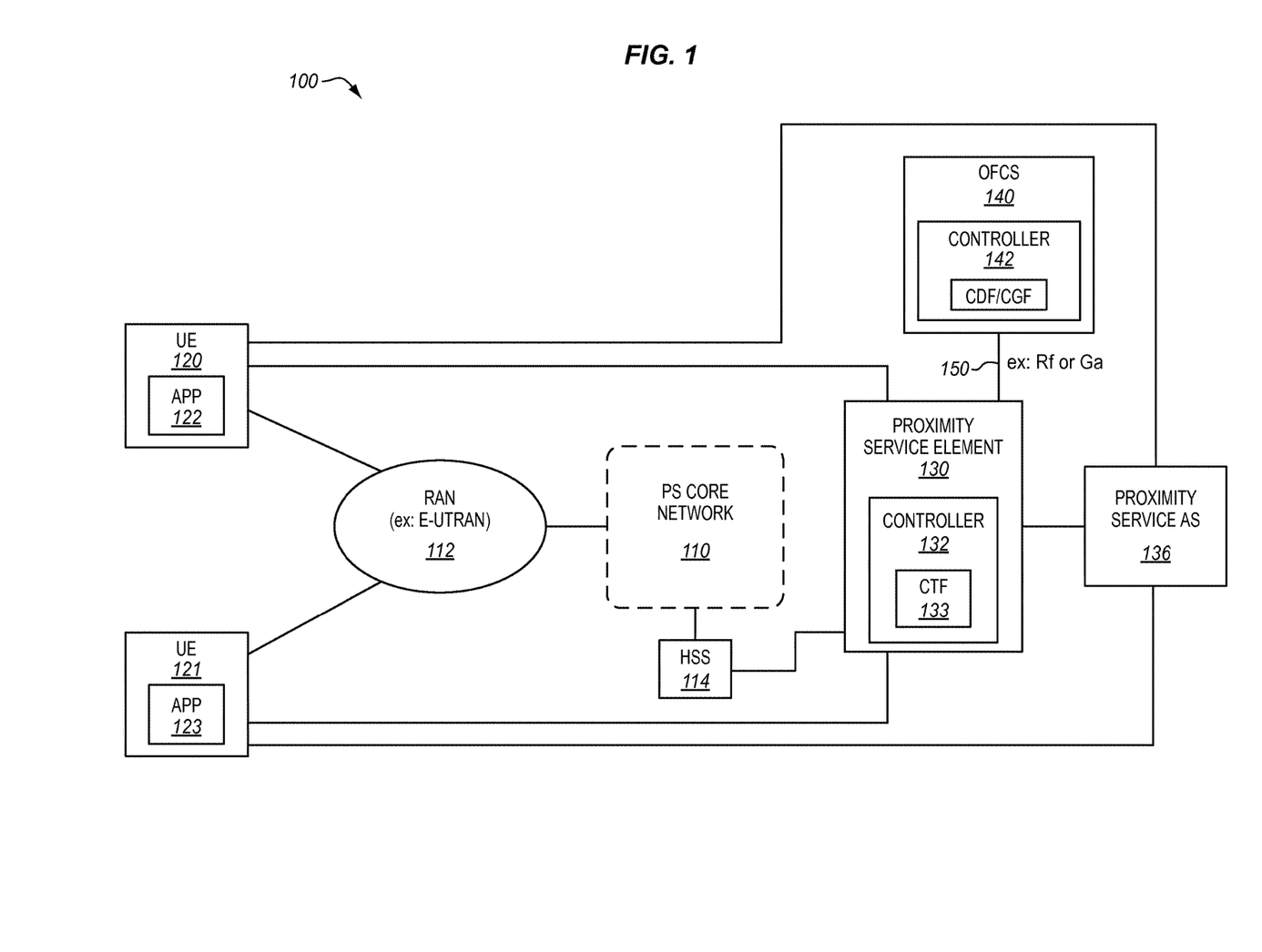
FIG. 1 illustrates an architecture of a mobile network for proximity services in an exemplary embodiment.

FIG. 1 illustrates an architecture of a mobile network 100 (e.g., Public Land Mobile Network (PLMN)) that provides proximity services. Mobile network 100 includes a Packet-Switched (PS) core network 110, such as an Evolved Packet Core (EPC), that communicates with UEs 120-121 over a Radio Access Network (RAN) 112. One example of RAN 112 is an Evolved-UMTS Terrestrial Radio Access Network (E-UTRAN). Although not shown in FIG. 1, RAN 112 includes a plurality of base stations (e.g., eNodeB) that provide wireless connections between UEs 120-121 (and other UEs) and PS core network 110. PS core network 110 may include one or more network elements that serve UEs 120-121, such as a Mobility Management Entity (MME), a Serving Gateway (S-GW), a Packet Data Network Gateway (P-GW), a Home Subscriber Server (HSS), etc.

The architecture shown in FIG. 1 illustrates a non-roaming scenario. However, there may be other architectures applicable to the embodiments described herein, such as an inter-PLMN architecture, a roaming architecture, an architecture when a UE is covered by a WLAN instead of RAN 112, etc. Similar scenarios are shown in 3GPP TS 23.303 (v12.0.0), which is incorporated by reference as if fully included herein.

Mobile network 100 further includes a proximity service element 130 and a proximity service Application Server (AS) 136. Proximity service element 130 comprises any server, device, apparatus, or equipment (including hardware) that is used for network-related actions required for proximity services. Proximity service element 130 may play different roles for controlling the features of a proximity service. For example, proximity service element 130 may authorize and provision a UE that requests a proximity service. Proximity service element 130 may authorize and provision a UE that requests to initiate a discovery procedure for the proximity service. Proximity service element 130 may authorize and provision a UE that requests to initiate a direct communication for the proximity service. Proximity service AS 136 comprises any server, device, apparatus, or equipment (including hardware) that supports proximity service element 130 in providing proximity services.

UEs 120-121 comprise any devices used directly by an end user for communication, such as a mobile terminal, a laptop computer equipped with a mobile broadband adapter, etc. UEs 120-121 are considered enabled for proximity services, meaning that they support the requirements and associated procedures for one or more proximity services. Each UE 120-121 includes an application 122 and 123, respectively, that is used to access/provide a proximity service. The applications 122-123 may be configured for a local voice service, multimedia content sharing, gaming, group multicast, content-aware applications, public safety, etc. As an example, application 122 may provide a proximity service where a department store can directly send a message to UE 120 through application 122 when UE 120 is proximate to the department store. As another example, application 122 may comprise a social network application (e.g., Facebook®) that allows for direct communication with another UE.

Mobile network 100 is enhanced in this embodiment to implement offline charging for proximity services. For one enhancement, a controller 132 in proximity service element 130 implements a Charging Trigger Function (CTF) 133 for offline charging. A CTF is a component that detects chargeable events for services, assembles information for the chargeable events into matching charging events, and sends the charging events to a Charging Data Function (CDF). CTF 133 is configured to trigger on events related to a proximity service, to collect information regarding the proximity service, and report the information to a charging system. Although not shown in FIG. 1, proximity service element 130 may also include a CDF for offline charging.

Another enhancement in this embodiment is that mobile network 100 includes an Offline Charging System (OFCS) 140. OFCS 140 comprises a server, device, apparatus, or equipment (including hardware) that provides offline charging for proximity services provided in mobile network 100. Offline charging is a process where charging information for resource usage is collected concurrently with resource usage. Offline charging can be of two types: session-based or event-based. In event-based charging, a CTF reports the usage or the service rendered where the service offering is rendered in a single operation. For example, the CTF may report the usage in an Accounting Request (ACR) EVENT. Session-based charging is the process of reporting usage for a service, and uses the START, INTERIM, and STOP accounting data. During a service, a CTF may transmit multiple ACR Interims depending on the proceeding of the session. OFCS 140 includes a controller 142 that may implement a Charging Data Function (CDF), a Charging Gateway Function (CGF), or both. A CDF comprises an element or module that receives charging events from CTFs, formats the charging events into Charging Data Records (CDRs), and sends the CDRs to a CGF. A CGF comprises an element or module within an OFCS that correlates CDRs for a session, and forwards a CDR file with the correlated CDRs to a billing domain for subscriber billing and/or inter-operator accounting.

Yet another enhancement in mobile network 100 is an interface 150 or reference point defined between proximity service element 130 and OFCS 140. The interface 150 as described herein allows proximity service element 130 to provide offline charging information to OFCS 140 that is related to a proximity service. For example, interface 150 may comprise a Diameter Rf interface that is enhanced with one or more new Attribute Value Pairs (AVPs) that are defined for charging information related to a proximity service. In another example, interface 150 may represent the Ga or Bx reference point, and one or more new fields may be defined in a CDR for charging information related to a proximity service. A CDR is a formatted collection of information about one or more chargeable event(s) for use in billing and accounting The offline charging principles discussed herein may be for scenarios where UEs are served by E-UTRAN or non-E-UTRAN, where UEs are located in a Home PLMN (HPLMN) or Visited PLMN (VPLMN), where UEs act as a transmitter or receiver in a direct communication, where UEs belong to one or multiple PLMNs, where UEs are grouped together by an Application ID with assigned Application code(s) from a HPLMN proximity service element, etc.

The architecture shown in FIG. 1 may resemble the architecture described in 3GPP TS 23.303 for Proximity Services (ProSe). Although the architecture may comply with 3GPP specifications, the concepts discussed herein are applicable to any proximity service that enables direct communication between end user devices.

Proximity services as discussed herein include the following functions: discovery, direct communication (D2D), and UE-to-network relay. Discovery is a process that identifies a UE in proximity of other UEs. One type of discovery is direct discovery, which is a process employed by a UE to discover other UEs in its vicinity by using only the capabilities of the two UEs. For example, one UE may use local radio resources to discover the presence of other UEs in its vicinity. Another type of discovery (referred to by the 3GPP as EPC-level discovery) uses a server in the network to monitor the location of UEs, and inform the UEs of their proximity.

Direct communication is a communication between two or more UEs in proximity by means of user data plane transmission using radio technology (e.g., E-UTRA) via a channel not traversing any network node (other than possibly a base station of a RAN). Direct communication allows the UEs to use local radio resources to communicate directly with each other without routing traffic through a core network, such as PS core network 110. For example, UEs may directly communicate through the radio resources available to both UEs from a RAN, such as from a base station. UEs may also directly communicate through the radio resources of the UEs themselves. Either way, the traffic exchanged between the UEs is not routed through the core network, but is routed directly between the UEs over a wireless interface.

Figure 2:
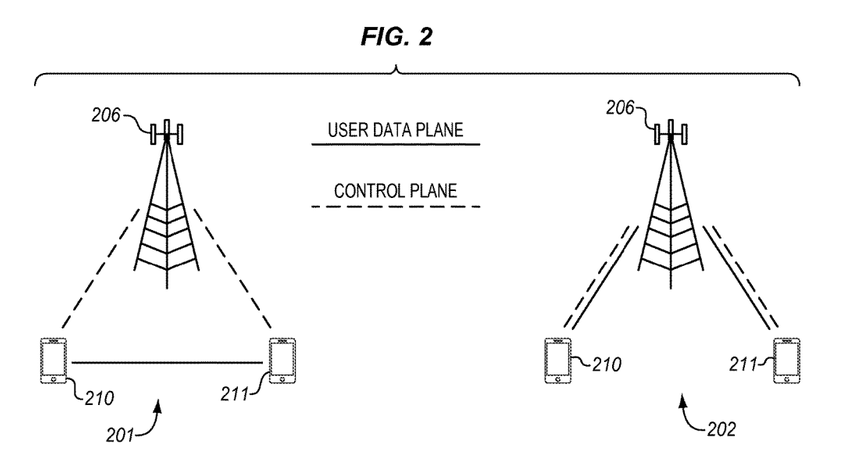
FIG. 2 illustrates direct communication scenarios between two UEs.

FIG. 2 illustrates direct communication scenarios between two UEs. In scenario 201, a base station 206 is in communication with UEs 210-211. Base station 206 communicates with UEs 210-211 over the control plane (also referred to as control path or control channel) to exchange signaling messages and other types of control messages with UEs 210-211. UEs 210-211 are able to establish a direct communication over a user data plane (also referred to as a data path or data channel) using local radio resources to communicate directly with each other without routing traffic through a core network. In scenario 202, base station 206 again communicates with UEs 210-211 over the control plane to exchange signaling messages and other types of control messages with UEs 210-211. UEs 210-211 are able to establish a direct communication over the user data plane through base station 206 without routing traffic through a core network. In each of the above scenarios, UEs 210-211 establish a direct communication between each other, which is also referred to herein as a D2D communication.

UE-to-network relay is a function where one UE provides functionality to support connectivity to "unicast" services for one or more remote UEs. A remote UE refers to a UE that is not served by a RAN (e.g., E-UTRAN), and communicates with the network through a UE-to-network relay. For instance, if a remote UE is out-of-coverage of a RAN, then the remote UE may still access the PDN through another UE (relay UE) that is in-coverage of the RAN. A relay UE is a device that is enabled for UE-to-network relay. UE-to-network relay allows for communications from the network to a remote UE via a relay UE which is in-coverage, or from a remote UE to the network via a relay UE that is in-coverage. Therefore, the term "UE-to-network relay" refers to communication from a remote UE to the network, and from the network to the remote UE.

For this embodiment, it is assumed that UE 120 wants to initiate a proximity service, such as a direct communication with UE 121. UE 120 is programmed to contact proximity service element 130 when initiating a proximity service. UE 120 may contact proximity service element 130 to request authorization for a proximity service, to request authorization to perform discovery for a proximity service (e.g., Announce request, Monitor request, or Match report), to request authorization to initiate a direct communication for a proximity service (e.g., One-to-One, One-to-Many, or One-to-All), etc. Thus, UE 120 may send different types of requests to proximity service element 130 regarding a proximity service over the control plane. Proximity service element 130 is enhanced to initiate offline charging in response to one or more requests from UE 120.

Figure 3:
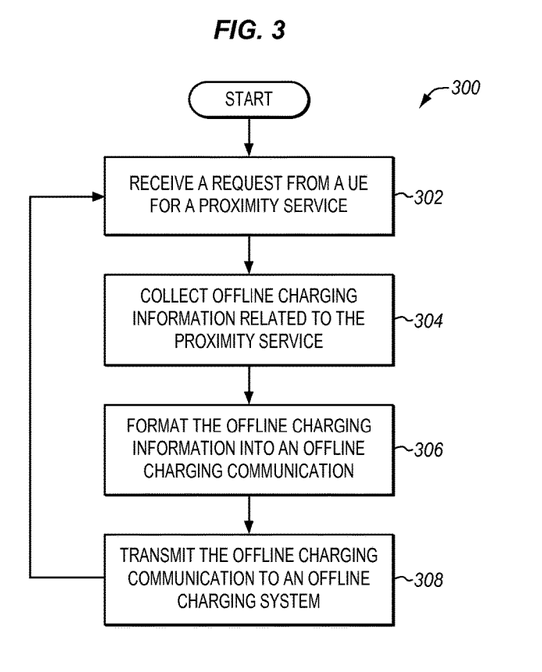
FIG. 3 is a flow chart illustrating a method for providing offline charging for a proximity service in an exemplary embodiment.

FIG. 3 is a flow chart illustrating a method 300 for charging for a proximity service in an exemplary embodiment. The steps of method 300 will be described with reference to proximity service element 130 in FIG. 1, but those skilled in the art will appreciate that method 300 may be performed in other systems. Also, the steps of the flow charts described herein are not all inclusive and may include other steps not shown, and the steps may be performed in an alternative order.

Controller 132 in proximity service element 130 receives a request from UE 120 for the proximity service (step 302). CTF 133 in proximity service element 130 is programmed to trigger on certain chargeable events related to proximity services. Thus, CTF 133 triggers on receipt of the request from UE 120. Controller 132 (through CTF 133) collects offline charging information related to the proximity service (step 304). The offline charging information comprises any information that a charging system or billing domain may use to charge for a proximity service. The offline charging information, at least in part, may apply solely to a proximity service (as opposed to a regular session over mobile network 100). To illustrate examples of offline charging information, CTF 133 may collect an identity of the mobile subscriber (e.g. IMSI), identity of the PLMN (e.g., mobile network 100), the type of feature requested (e.g., discovery, direct communication, or both), the model of direct discovery used by the UE (e.g., Model A or Model B), the role of the UE in a discovery procedure (e.g., Announcing UE, Monitoring UE, or Match Report), an Application ID used in direct discovery, an Application code allocated to an Announcing UE, an Application code(s) and timestamp(s) reported by a Monitoring UE in a Match Report, a type of direct communication requested by a UE (e.g., One-to-One, One-to-Many or One-to-All), an identity of participants in a group (e.g., for a One-to-Many direct communication), etc. Any desired information may be collected for the proximity service that may be used to charge for the proximity service. A more detailed discussion of the offline charging information is provided later in this specification.

After collecting the offline charging information, controller 132 formats the offline charging information into an offline charging communication (step 306). An offline charging communication comprises a message, record, file, etc., that reports the offline charging information. The type of offline charging communication depends on the interface used between proximity service element 130 and OFCS 140. If the CDF is external to proximity service element 130, then the offline charging communication may comprise a Diameter Rf Accounting Request (ACR) [Event, Start, Interim, or Stop] or another type of accounting request. Controller 132 may therefore format the offline charging information related to the proximity service into Attribute Value Pairs (AVP) of the ACR. If the CDF is integrated within proximity service element 130, then the offline charging communication may comprise a CDR. Controller 132 then transmits the offline charging communication to OFCS 140 (step 308).

If a CDF is implemented in OFCS 140, then the CDF generates a CDR for the proximity service based on the accounting request(s) received from proximity service element 130. If a CDF is implemented within proximity service element 130, then a CGF within OFCS 140 receives a CDR from proximity service element 130.

This embodiment enables session-based offline charging by generating multiple partial CDRs for a proximity service. A partial CDR is a CDR that is generated before a proximity service ends. For example, a CDF has one or more triggers for closing a CDR, such as a timer. For example, when a CDF first receives an ACR[Start] from a CTF, the CDF sets a timer. If the CDF receives an ACR[Stop] from the CTF before expiration of the timer, then the CDF closes the CDR to generate a full CDR. If the CDF does not receive an ACR[Stop] from the CTF before expiration of the timer, then the CDF closes the CDR to generate a partial CDR. The CDF then opens a new CDR for the session. The CDF will continue to generate partial CDRs when the timer expires until an ACR[Stop] is received from the CTF. A partial CDR may include a start timestamp, a stop timestamp, or an interval for a proximity service. A partial CDR may include the charging ID for the proximity service, may indicate a change to the Mode of Direct Communication, such as a change from transmitting to receiving (or vice-versa), etc.

Figure 4:
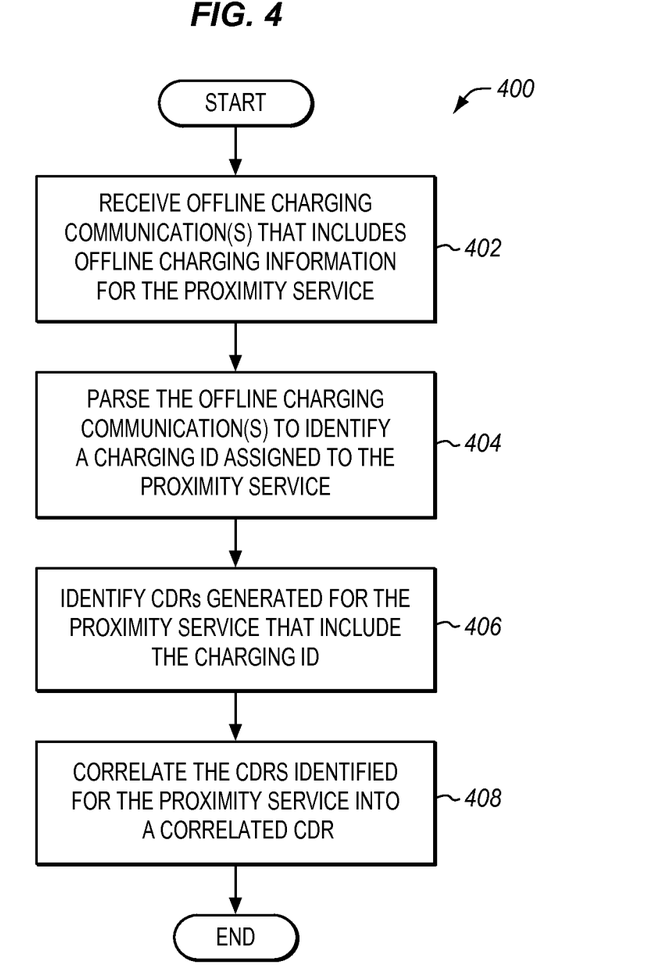
FIG. 4 is a flow chart illustrating a method for correlating CDRs for a proximity service in an exemplary embodiment.

When session-based offline charging is implemented, OFCS 140 may receive or generate multiple CDRs for the proximity service. When controller 142 of OFCS 140 provides a CGF, the CGF correlates the CDRs for the proximity service as is described in FIG. 4. FIG. 4 is a flow chart illustrating a method 400 for correlating CDRs for a proximity service in an exemplary embodiment. The steps of method 400 will be described with reference to OFCS 140 in FIG. 1, but those skilled in the art will appreciate that method 300 may be performed in other systems.

Controller 142 in OFCS 140 receives one or more offline charging communications from proximity service element 130 that includes offline charging information for the proximity service (step 402). Controller 142 parses the offline charging communication to identify a charging ID assigned to the proximity service (step 404). If the offline charging communication comprises a Diameter Rf message, then controller 142 may open or update a CDR for the proximity service based on the offline charging information in the Diameter Rf message. If the offline charging communication comprises a CDR, then controller 142 temporarily stores the CDR. At some point, controller 142 will trigger a correlation procedure to combine multiple CDRs generated for the proximity service into a correlated CDR. In this embodiment, controller 142 is able to correlate the CDRs (partial or full) for the proximity service based on the unique charging ID that is assigned to the proximity service by proximity service element 130. Therefore, controller 142 identifies CDRs generated for the proximity service that include the charging ID (step 406). In other words, controller 142 determines which CDRs have a field that is populated with the charging ID for the proximity service. The CDRs may be received from one or more CDFs. Controller 142 then correlates the CDRs identified for the proximity service into a correlated CDR (step 408). After correlation, controller 142 may transfer the correlated CDR to the billing domain.

This embodiment also encompasses other ways of generating CDRs for the proximity service. For example, the CDF and CGF may be implemented at proximity service element 130. In another example, the CDF may be implemented at proximity service element 130, and the CGF may be implemented at the billing domain.

The embodiments described above advantageously allow for offline charging for a proximity service because proximity service element 130 is able to transfer offline charging information for the proximity service to OFCS 140. The content of the offline charging information may vary as desired. In one example, the offline charging information may include the following data:

Application ID
Application Code
Filter ID
Event/Session ID
Charging ID
Discovery Model (Model A or Model B)
Discovery Role Type (Announcing/Monitoring/Match Report or discoverer/discoveree)
Direct Communication Type (One-to-One, One-to-Many, or One-to-All)
Subscriber ID
Subscriber Mode (Transmitter or Receiver)
Number of Recipients
Subscriber PLMN ID
Function ID
Subscriber Location Information
Served Network Type (E-UTRAN or non-E-UTRAN)
Timestamps In order to send this type of offline charging information to OFCS 140, new AVPs may be defined for the Diameter Rf reference point (also referred to as the Diameter Rf interface) to transport the offline charging information. The following lists some exemplary AVPs that are newly-defined herein for Diameter Rf.

A new AVP may be defined for an Application ID associated with a proximity service. The Application ID is a globally unique identifier for a specific application (e.g., executing on a UE) designed to perform the functions of a proximity service.

A new AVP may be defined for an Application code associated with a proximity service. The Application code is a code used in a discovery procedure for an announcing UE, and is contained in the message that is actually transmitted over the radio interface by an announcing UE engaged in a discovery procedure to monitoring UEs.

The Application code may be composed of a temporary identity that corresponds with the Application ID, and the PLMN ID of the proximity service element that assigned the application code (e.g., Mobile Country Code (MCC) and Mobile Network Code (MNC)). A proximity service element allocates an Application code per announcing UE and per application, and also allocates an associated validity timer that runs both in the proximity service element and in the UE. This AVP may also indicate the validity timer associated with the Application code.

A new AVP may be defined for a Filter ID associated with a proximity service. The Filter ID is used in a discovery procedure, and includes Application Code(s) or mask(s) that a UE monitors during a discovery procedure. When a UE detects that one or more Application Code(s) match the filter, the UE reports the Application Code(s) to a proximity service element.

A new AVP may be defined for an Event ID or Session ID assigned to the proximity service.

A new AVP may be defined for a Charging ID assigned to the proximity service. The Charging ID is a unique charging identifier for a proximity service. The Charging ID may be a string that combines the Application ID, the Application code, and the Event/Session ID. A proximity service element assigns a Charging ID for the event or session. The first UE involved in the event or session will receive the Charging ID from the proximity service element. If involved in a group communication, the UE will transfer the Charging ID to other UEs in the group for the event or session. Because UEs in a group may not belong to the same service provider, may not be served by E-UTRAN, may not trigger the same offline charging method, may be served by different proximity service elements, and/or may leave or join the group during the session, CDRs from the different UEs may reside in different CDF/CGF. To generate reliable billing invoices, correlation algorithms have to be performed at one or multiple CGFs or the billing domain. The unique Charging ID is a key to correlate and aggregate multiple CDRs from these CDFs/CGFs. For session-based charging, multiple partial CDRs may be generated with the same Charging ID. These partial CDRs may come to same CGF or different CGFs. The lead CGF collects these CDRs with the same Charging ID, and aggregates them into a single full CDR.

A new AVP may be defined for a Discovery Model used by a UE during a discovery procedure. For example, the 3GPP has defined two models for direct discovery (see 3GPP TS 23.303). The first is Model A, which uses the methodology of "I am here". The "announcing" UE broadcasts discovery messages at pre-defined discovery intervals and the "monitoring" UEs that are interested in these messages read and process them. Therefore, the announcing UE broadcasts information about itself. The second is Model B, which uses the methodology of "who is there?" or "are you there?". The "discoverer" UE sends information about other UEs that it would like to receive responses from. "Discoveree" UEs that are proximate to the discoverer UE may then respond with information related to the discoverer's request. This AVP may indicate whether a UE uses Model A or Model B for discovery.

A new AVP may be defined for a Discovery Role Type used by a UE during a discovery procedure. Model A defines roles for UEs that are participating in direct discovery. One role is as an announcing UE, where the UE announces certain information that could be used by UEs in proximity that have permission to discover. Another role is a monitoring UE, where the UE monitors certain information of interest in proximity of announcing UEs. Another role is a "Match report". A Match report is used by a monitoring UE when the Application code(s) that matches the Discovery Filter(s) does not have Application ID(s) already locally stored that correspond to the Application Code(s). Therefore, this AVP may indicate whether a UE requests the role as announcing, monitoring, or match report under Model A. Model B also defines two roles for UEs that are participating in direct discovery. One role is as a discoverer UE, where the UE transmits a request containing certain information about what it is interested to discover. The other role is a discoveree UE, where the UE that receives the request message can respond with some information related to the discoverer's request. Therefore, this AVP may indicate whether a UE is a discoverer or a discoveree UE under Model B.

A new AVP may be defined for a Direct Communication Type requested or used by a UE for a direct communication. Examples of direct communication types include: One-to-One, One-to-Many (or One-to-Group), and One-to-All. One-to-One is a direct communication between two UEs, where the bearers for the communication are bi-directional. IP packets passed to the radio layers on a given bearer will be transmitted by the physical layer with the associated L2 destination address. IP packets passed up from the radio layers on the same bearer will have been received over-the-air addressed to the same Layer-2 destination. One-to-Many is a multicast communication where an originating UE transmits IP data to an IP multicast address using the Layer-2 Group ID as the Destination Layer-2 ID. A receiving UE listens to the allocated radio resource to receive the One-to-Many direct communication. The receiving UE filters out the received packet based on the Layer-2 Group ID contained in the Destination Layer-2 ID. If it matches the Group IDs, then the packets are delivered to upper layers. The user plane packets will be delivered to the IP stack that filters the packets based on the Group IP multicast address. One-to-All is a direct communication where a UE broadcasts a communication to all authorized UEs in proximity.

A new AVP may be defined for the Mode of Direct Communication for a UE involved in a proximity service. For a One-to-Many or One-to-All communication, a UE may be an originating (or transmitting) UE or a receiving UE. In other words, the UE is either transmitting packets to one or more UEs, or is listening for packets being transmitting by another UE. This AVP indicates whether a UE is a transmitting or receiving UE for a direct communication.

A new AVP may be defined for Number of Recipients of a One-to-Many communication.

New AVPs may be defined for any other offline charging information discussed above. Also, because the offline charging information may be inserted in a CDR, new CDR fields may be defined for any of the offline charging information discussed above. For example, a new CDR field may be defined in a similar manner as each new AVP described above.

EXAMPLE

Figure 5:
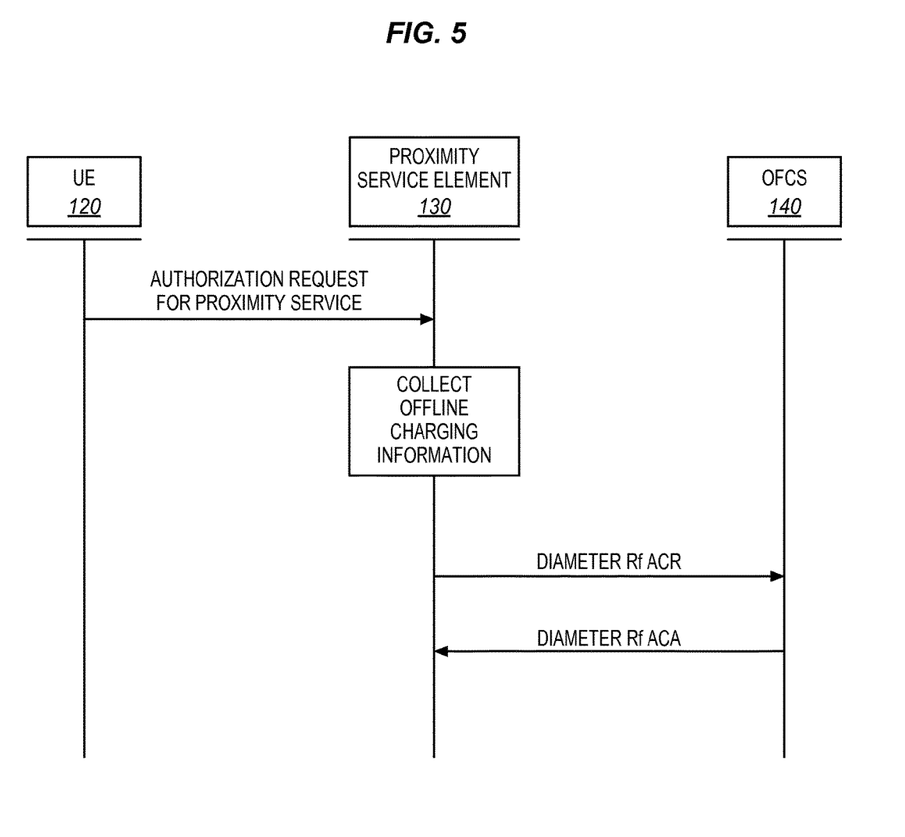
FIG. 5 is a message diagram illustrating offline charging for a proximity service in an exemplary embodiment.

FIG. 5 is a message diagram illustrating offline charging for a proximity service in an exemplary embodiment. It is assumed in this embodiment that a CDF is implemented in OFCS 140. To begin, UE 120 sends a request for authorization for the proximity service to proximity service element 130. The request may include an Application ID for the proximity service, a UE ID, or other information related to UE 120 or a proximity service requested by UE 120. UE 120 gets the service authorization for direct discovery and/or direct communication with a given validity time from proximity service element 130 (of its HPLMN). The service authorization procedure is executed before starting the setup of direct discovery or direct communication, when UE 120 is already engaged in a direct discovery or direct communication and changes its registered PLMN, or when the service authorization is no longer valid. In response to the request, proximity service element 130 (through its CTF 133) collects offline charging information related to the proximity service being requested by UE 120. Proximity service element 140 then formats the offline charging information into a Diameter Rf ACR. The Diameter Rf ACR includes one or more of the following newly-defined AVPs: Application ID, Application Code, Filter ID, Event/Session ID, Charging ID, Discovery Models, Discovery Role Types, Direct Communication Types, Subscriber Mode, and Number of Recipients. Proximity service element 130 then transmits the Diameter Rf ACR to the CDF within OFCS 140. The CDF may respond back to proximity service element 130 with a Diameter Rf Accounting Answer (ACA).

The ACR from proximity service element 130 reports offline charging information for the proximity service to OFCS 140. OFCS 140 may then generate a CDR for the proximity service, and insert the offline charging information from the ACR into the CDR. The message flow in FIG. 5 may repeat as UE 120 sends requests for the proximity service to proximity service element 130. Proximity service element 130 may trigger an ACR to OFCS 140 in response to one or more of the request to report offline charging information for the proximity service. Therefore, a network operator can effectively charge for the proximity services within its mobile network 100.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
a proximity service server that connects to at least one network element of a mobile network that serves a plurality of User Equipment (UE);
the proximity service server is configured to control proximity services provided by the mobile network between UEs in proximity to each other, wherein the proximity services include direct communication between UEs in proximity to each other using local radio resources; and
a Diameter Rf interface between the proximity service server and an offline charging system enhanced with Attribute Value Pairs (AVPs) that are defined for the proximity services;
the proximity service server comprising:
a controller configured to receive a request from a proximity service application executing on a UE to authorize a proximity service initiated by the UE, and to collect offline charging information for the proximity service in response to receiving the request, wherein the offline charging information applies solely to the proximity service;
the controller is configured to format the offline charging information for the proximity service into at least one of the AVPs of a Diameter Rf Accounting Request (ACR) that reports the offline charging information for the proximity service, and to transmit the Diameter Rf ACR to the offline charging system to charge for the proximity service.

2. The apparatus of claim 1 wherein:
the controller is configured to format the offline charging information for the proximity service into:
an AVP defined for a filter identifier used in a discovery procedure, wherein the filter identifier includes application codes and masks that the UE monitors during the discovery procedure.

3. The apparatus of claim 1 wherein:
the controller is configured to format the offline charging information for the proximity service into:
an AVP defined for an application identifier for the proximity service application on the UE that is designed to perform functions of the proximity service; and
an AVP defined for an application code used by the UE in a discovery procedure.

4. The apparatus of claim 1 wherein:
the controller is configured to format the offline charging information for the proximity service into:
an AVP defined for a charging identifier, wherein the charging identifier is a unique identifier assigned to the proximity service by the proximity service server.

5. The apparatus of claim 1 wherein:
the controller is configured to format the offline charging information for the proximity service into:
an AVP defined for a discovery model used by the UE in a discovery procedure, wherein the discovery model is selected between Model A and Model B as defined by the Third Generation Partnership Project (3GPP); and
an AVP defined for a discovery role type used by a UE during the discovery procedure according to the discovery model, wherein the discovery role type is selected between announcing, monitoring, and match report under Model A, or between discoverer and discoveree under Model B.

6. The apparatus of claim 1 wherein:
the controller is configured to format the offline charging information for the proximity service into:
an AVP defined for a direct communication type requested by the UE for a direct communication, wherein the direct communication type is selected between One-to-One, One-to-Many, or One-to-All.

7. The apparatus of claim 6 wherein:
the controller is configured to format the offline charging information for the proximity service into:
an AVP defined for a direct communication mode indicating whether the UE acts as a transmitter or receiver for a One-to-Many or One-to-All communication type.

8. The apparatus of claim 1 wherein:
the controller is configured to format the offline charging information for the proximity service into:
an AVP defined for a number of recipients for a One-to-Many communication type.

9. The apparatus of claim 1 wherein:
the controller is configured to format the offline charging information for the proximity service into:
an event identifier or session identifier assigned to the proximity service.

10. A method for implementing offline charging in a proximity service server of a mobile network, the method comprising:

controlling, by the proximity service server which connects to at least one network element of the mobile network that serves a plurality of User Equipment (UE), proximity services provided by the mobile network between UEs in proximity to each other, wherein the proximity services include direct communication between UEs in proximity to each other using local radio resources;
receiving, by the proximity service server, a request from a proximity service application executing on a UE to authorize a proximity service initiated by the UE;
collecting, by the proximity service server, offline charging information for the proximity service in response to receiving the request, wherein the offline charging information applies solely to the proximity service;
wherein a Diameter Rf interface is defined between the proximity service server and an offline charging system that is enhanced with Attribute Value Pairs (AVPs) that are defined for the proximity services;
formatting, by the proximity service server, the offline charging information for the proximity service into at least one of the AVPs of a Diameter Rf Accounting Request (ACR) that reports the offline charging information for the proximity service; and
transmitting the Diameter Rf ACR from the proximity service server to the offline charging system to charge for the proximity service.

11. The method of claim 10 wherein formatting the offline charging information comprises:
formatting the offline charging information into:
an AVP defined for a filter identifier used in a discovery procedure, wherein the filter identifier includes application codes and masks that the UE monitors during the discovery procedure.

12. The method of claim 10 wherein formatting the offline charging information comprises:
formatting the offline charging information into:
an AVP defined for an application identifier for the proximity service application on the UE that is designed to perform functions of the proximity service; and
an AVP defined for an application code used by the UE in a discovery procedure.

13. The method of claim 10 wherein formatting the offline charging information comprises:
formatting the offline charging information into:
an AVP defined for a charging identifier, wherein the charging identifier is a unique identifier assigned to the proximity service by the proximity service server.

14. The method of claim 10 wherein formatting the offline charging information comprises:
formatting the offline charging information into:
an AVP defined for a discovery model used by the UE in a discovery procedure, wherein the discovery model is selected between Model A and Model B as defined by the Third Generation Partnership Project (3GPP); and
an AVP defined for a discovery role type used by a UE during the discovery procedure according to the discovery model, wherein the discovery role type is selected between announcing, monitoring, and match report under Model A, or between discoverer and discoveree under Model B.

15. The method of claim 10 wherein formatting the offline charging information comprises:
formatting the offline charging information into:

an AVP defined for a direct communication type requested by the UE for a direct communication, wherein the direct communication type is selected between One-to-One, One-to-Many, or One-to-All.

16. The method of claim 15 wherein formatting the offline charging information comprises:
formatting the offline charging information into:
an AVP defined for a direct communication mode indicating whether the UE acts as a transmitter or receiver for a One-to-Many or One-to-All communication type.

17. The method of claim 10 wherein formatting the offline charging information comprises:
formatting the offline charging information into:
an AVP defined for a number of recipients for a One-to-Many communication type.

18. An apparatus comprising:
an Offline Charging System (OFCS) configured to communicate with a proximity service server that controls proximity services for a mobile network over a Diameter Rf interface enhanced with Attribute Value Pairs (AVPs) that are defined for the proximity services;
the OFCS having a controller configured to receive Diameter Rf Accounting Requests (ACRs) from the proximity service server that includes offline charging information for a proximity service involving User Equipment (UE), wherein the offline charging information for the proximity service is formatted into at least one of the AVPs of the Diameter Rf ACR;
the controller is configured to parse the at least one of the AVPs of the Diameter Rf ACRs to identify a charging identifier assigned to the proximity service by the proximity service server, to generate Charging Data Records (CDRs) for the proximity service based on the offline charging information in the at least one of the AVPs of the Diameter Rf ACRs, and to insert the offline charging information from the Diameter Rf ACRs into the CDRs;
the controller is configured to trigger a correlation procedure to combine the CDRs generated for the proximity service into a correlated CDR, to identify the CDRs generated for the proximity service that include the charging identifier assigned by the proximity service server, to correlate the CDRs identified for the proximity service to generate the correlated CDR, and to transfer the correlated CDR to a billing domain.

19. The apparatus of claim 18 wherein:
the controller in the OFCS implements a Charging Data Function and a Charging Gateway Function.

20. The apparatus of claim 18 wherein:
the CDRs generated for the proximity service comprise partial CDRs.

* * * * *